(12) United States Patent
Loic et al.

(10) Patent No.: US 12,450,471 B2
(45) Date of Patent: Oct. 21, 2025

(54) EQUIPMENT ANOMALY DETECTION METHOD, COMPUTER READABLE STORAGE MEDIUM, CHIP, AND DEVICE

(71) Applicant: Chengdu Synsense Technology Co., Ltd., Sichuan (CN)

(72) Inventors: Jeanningros Loic, Lausanne (CH); Richard Muir Dylan, Allschwil (CH); Weidel Philipp, Zurich (CH)

( * ) Notice: Subject to any disclaimer, the term of this patent is extended or adjusted under 35 U.S.C. 154(b) by 1172 days.

(21) Appl. No.: 17/311,387

(22) PCT Filed: Jan. 25, 2021

(86) PCT No.: PCT/CN2021/073641
§ 371 (c)(1),
(2) Date: Jun. 7, 2021

(87) PCT Pub. No.: WO2022/155964
PCT Pub. Date: Jul. 28, 2022

(65) Prior Publication Data
US 2023/0359869 A1  Nov. 9, 2023

(51) Int. Cl.
*G06N 3/0455* (2023.01)
*G06N 3/049* (2023.01)
*G06N 3/063* (2023.01)

(52) U.S. Cl.
CPC ........... *G06N 3/0455* (2023.01); *G06N 3/049* (2013.01); *G06N 3/063* (2013.01)

(58) Field of Classification Search
CPC ....... G06N 3/0455; G06N 3/049; G06N 3/063
See application file for complete search history.

(56) References Cited

U.S. PATENT DOCUMENTS 5,852,793 A * 12/1998 Board ................ G01M 13/045
702/56
2007/0288409 A1   12/2007 Mukherjee
(Continued)

FOREIGN PATENT DOCUMENTS

| CN | 108229661 | 6/2018 |
|---|---|---|
| CN | 110647900 | 1/2020 |

(Continued)

OTHER PUBLICATIONS

Martinelli et al. "Electric Power System Anomaly Detection Using Neural Networks", Lecture Notes in Computer Science, DBLP, Sep. 20, 2004 (Year: 2004).*

(Continued)

*Primary Examiner* — Matthew M Kim
*Assistant Examiner* — Bryan P Huang
(74) *Attorney, Agent, or Firm* — Michael D. Eisenberg; MDE Patents

(57) ABSTRACT

A detection device is provided in the disclosure. The device uses unsupervised or self-supervised neural networks to learn nominal conditions of a target system, such as a device or a machine. The trained neural networks can reproduce sensory signals of the target system as a neural-network-reconstructed version of the sensory signals in the nominal conditions of a target system. The equipment anomaly detection device may analyze and predict operation conditions of the target system based on the neural-network-reconstructed version exceeding a certain level. When signal difference between the sensory signals and the neural-network-reconstructed version exceeds a certain level, the equipment anomaly detection device may issue an alert signal to reflect abnormal operation conditions of the target system.

11 Claims, 9 Drawing Sheets

(56) References Cited

U.S. PATENT DOCUMENTS

| | | | |
|---|---|---|---|
| 2018/0275642 A1* | 9/2018 | Tajima | G06N 3/044 |
| 2020/0026981 A1 | 1/2020 | Chang | |
| 2020/0082245 A1 | 3/2020 | Hao et al. | |
| 2020/0104200 A1* | 4/2020 | Kocberber | G06N 3/082 |
| 2020/0264219 A1 | 8/2020 | Hagiwara | |
| 2020/0380531 A1 | 12/2020 | Vaidya et al. | |

FOREIGN PATENT DOCUMENTS

| | | |
|---|---|---|
| CN | 111967571 | 11/2020 |
| JP | 55-78250 | 6/1980 |
| JP | 2020-135170 | 8/2020 |
| WO | WO 2019/125419 | 6/2019 |
| WO | WO 2019/240845 | 12/2019 |

OTHER PUBLICATIONS

Tetzlaff et al. "Synaptic Scaling Enables Dynamically Distinct Short- and Long-Term Memory Formation", PLoS Comput Biol 9(10): e1003307, Oct. 31, 2013 (Year: 2013).*

Panda et al. "Unsupervised Regenerative Learning of Hierarchical Features in Spiking Deep Networks for Object Recognition", Feb. 3, 2016. Retrieved from the Internet: <URL:https://arxiv.org/abs/1602.01510> (Year: 2016).*

Tavanaei et al. "Representation learning using event-based STDP", Neural Networks 105 pp. 294-303, Jun. 1, 2018 (Year: 2018).*

Lee et al. "Training Deep Spiking Convolutional Neural Networks With STDP-Based Unsupervised Pre-training Followed by Supervised Fine-Tuning", Frontiers in Neuroscience vol. 12 Article 435, Aug. 3, 2018 (Year: 2018).*

Pfeiffer et al. "Deep Learning With Spiking Neurons: Opportunities and Challenges", Oct. 25, 2018, Frontiers in Neuroscience 12 :774 (Year: 2018).*

Suresh et al. Realizing spike-timing dependent plasticity learning rule in Pt/Cu:ZnO/Nb:STO memristors for implementing single spike based denoising autoencoder, J. Micromech. Microeng 29 (2019) 065006 (9pp), Jun. 5, 2019 (Year: 2019).*

Hastie, "Ridge Regularization: an Essential Concept in Data Science", May 30, 2020. Retrieved from the Internet: <URL: https://doi.org/10.48550/arXiv.2006.00371> (Year: 2020).*

Notice of Reasons for Refusal Dated Nov. 21, 2023 From the Japan Patent Office Re. Application No. 2021-560351 and It Translation Into English. (12 Pages).

Notification of Office Action and Search Report Dated Aug. 22, 2022 From the State Intellectual Property Office of the People's Republic of China Re. Application No. 202180000178.4. (10 Pages).

Zhang et al. "Abnormal Electricity Behavior Recognition of Graph Regularization Nonlinear Ridge Regression Model", Computer Engineering, 44(6): 8-12, Jun. 30, 2018.

Zhou et al. "Research Progress of Modern Material Science and Technology", Wuhan University of Technology Press, p. 152-155, Dec. 30, 2012.

Notice of Reasons for Refusal Dated May 2, 2023 From the Japan Patent Office Re. Application No. 2021-560351 and Its Translation Into English. (13 Pages).

Notification of Office Action and Search Report Dated Feb. 18, 2023 From the State Intellectual Property Office of the People's Republic of China Re. Application No. 202180000178.4. (10 Pages).

Written Opinion and Search Report Dated Mar. 17, 2023 From the Intellectual Property Office of Singapore, IPOS Re. Application No. 11202111445T. (11 Pages).

Burbank "Mirrored STDP Implements Autoencoder Learning in a Network of Spiking Neurons", PLOS Computational Biology, 11(12): e1004566-1-e1004566-35, Dec. 3, 2015.

Florcano et al. Bio-Inspired Artificial Intelligence, p. 113-115, Feb. 28, 2017 & English Abstract.

Stratton et al. "A Spiking Neural Network Based Auto-Encoder for Anomaly Detection in Streaming Data", 2020 IEEE Symposium Series on Computational Intelligence, SCCI, p. 1981-1988, Dec. 4, 2020.

* cited by examiner

EQUIPMENT ANOMALY DETECTION METHOD, COMPUTER READABLE STORAGE MEDIUM, CHIP, AND DEVICE

RELATED APPLICATION

This application is a National Phase of PCT Patent Application No. PCT/CN2021/073641 having International filing date of Jan. 25, 2021. The content of the above application is all incorporated by reference as if fully set forth herein in its entirety.

FIELD AND BACKGROUND OF THE INVENTION

The present disclosure relates to the field of computer technology, and more particularly, to neural network based equipment anomaly detection method, and device.

Industrial and residential machines typically use motors to drive operational mechanisms and functions. Motors and mechanical parts may age and wear. When deformation of such components aggregate to a certain level may cause a machine to fail suddenly and sometimes unexpectable accidences and loss.

End users and consumers of industrial and residential machines have difficulties to obtain sufficient data to recognize anomalies, such as malfunctioning, faults, or failure modes of the machines. Insufficient data may render such anomalies unpredictable.

A first aspect of the present disclosure is to propose an equipment anomaly detection device. The equipment anomaly detection device includes a cascade of neural networks and a detection module. The cascade of neural networks is configured for receiving and learning N nominal sensor event streams from N event stream input connections in a learning state to form a learned state of the cascade of neural networks. The cascade of neural networks in the learned state receives N monitored sensor event streams from the N event stream input connections as input of the cascade of neural networks in an operation state, and outputs N monitored reconstructed event streams as output of the cascade of neural networks based on the N monitored sensor event streams. The N monitored reconstructed event streams represent a reconstructed version of the N monitored sensor event streams. The detection module is configured for calculating difference between the N monitored sensor event streams and the N monitored reconstructed event streams. The detection module sends a detection trigger when the difference between N monitored sensor event streams and N monitored reconstructed event streams exceeds a threshold difference value.

A second aspect of the present disclosure is to propose an equipment anomaly detection method. The method includes using an cascade of neural networks to receive and learn N nominal sensor event streams from N event stream input connections in a learning state to form a learned state of the cascade of neural networks, wherein the cascade of neural networks in the learned state receives N monitored sensor event streams from the N event stream input connections as input of the cascade of neural networks in an operation state, and outputs N monitored reconstructed event streams as output of the cascade of neural networks based on the N monitored sensor event streams, and the N monitored reconstructed event streams represent a reconstructed version of the N monitored sensor event streams; and calculating difference between the N monitored sensor event streams and the N monitored reconstructed event streams, wherein the detection module sends a detection trigger when the difference between N monitored sensor event streams and N monitored reconstructed event streams exceeds a threshold difference value.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a flash memory.

The disclosed method may be programmed as a computer program product, that causes a computer to execute the disclosed method.

The disclosed method may be programmed as a computer program, that causes a computer to execute the disclosed method.

The equipment anomaly detection system of the disclosure uses unsupervised or self-supervised neural networks to learn nominal conditions of a target system, such as a device or a machine. The trained neural networks can reproduce sensory signals of the target system as a neural-network-reconstructed version of the sensory signals in the nominal conditions of a target system. The equipment anomaly detection system may analyze and predict operation conditions of the target system that exceed a certain level based on the neural-network-reconstructed version. For example, when signal difference between the sensory signals and the neural-network-reconstructed version exceeds a certain level, the equipment anomaly detection system may issue an alert signal to reflect abnormal operation conditions of the target system, which may be a period ahead of an actual onset of system failure of the target system. Thus, personnel may have more time to address anomalies of the target system and prevent substantial loss.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF SPECIFIC EMBODIMENTS OF THE INVENTION

Embodiments of the disclosure are described in detail with reference to the accompanying drawings as follows. It can be appreciated that the embodiments described herein are merely a portion not all of the embodiments of the present invention. Based on the embodiments of the present invention, all other embodiments obtained by one of ordinary skill in the art without performing inventive work are within the claims of the present invention.

The disclosure presents an equipment anomaly detection method and device for detecting an anomaly in temporal signals of a monitored target, such as a system, a device, a facility, or a plant.

The equipment anomaly detection device in a learning state automatically adapts and learns a nominal state of the monitored target from nominal sensor signals and identifies deviations away from the nominal state as anomalies. The disclosed device uses online learning in an encoder-decoder network, to learn nominal input sensor signals in a learning state, and learns to reproduce a network reconstructed version of the nominal input sensor signals. The device in an operation state measures difference between current input sensor signals and the network reconstructed version of the current input sensor signals to detect and signal an anomaly associated with the monitored target and the current input sensor signals.

When the network reconstructed version matches the current input sensor signals, the equipment anomaly detection device determines the monitored target to be in the nominal state. When the difference between the current input sensor signals and the network reconstructed version is small, such as not exceeding a threshold, no anomaly signal is produced by the equipment anomaly detection device.

When the monitored target moves into an anomalous state, the network cannot reproduce the input sensor signals accurately. The equipment anomaly detection device may determine a trend of the monitored target where the difference between the current input sensor signals and network reconstructed version becomes greater, such as exceeding the threshold. Once this difference crosses a threshold magnitude, the equipment anomaly detection device raises and sends an anomaly signal.

Figure 1:
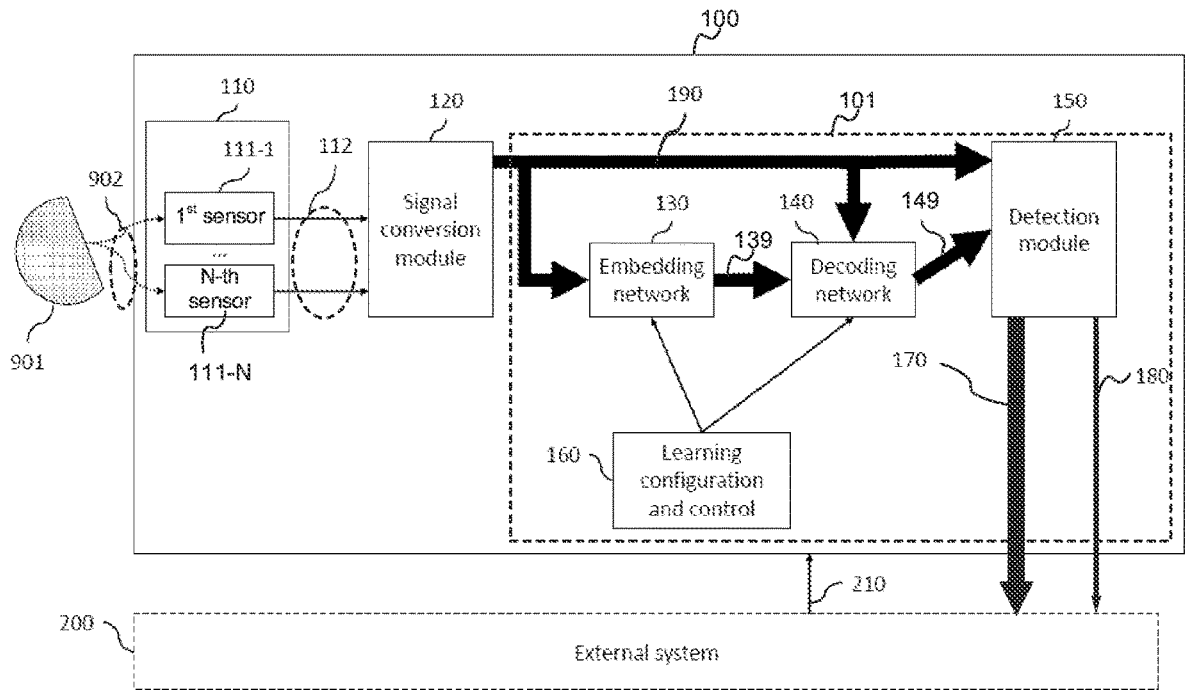
FIG. 1 is a schematic diagram showing an equipment anomaly detection system according to an embodiment of the present disclosure.

System Overview:

With reference to FIG. 1, an embodiment of the disclosure provides an equipment anomaly detection system 100. A monitored target system 901 may include one or more entities, such as one or more industrial plants, motors, devices, facilities, or systems. The monitored target system 901 emits vibration signals 902 indicative of the monitored target's condition.

A sensor system may include sensors 111-1 to 111-N for detecting the monitored target system 901. N is a positive integer, which may be two or more. For example, the sensors in the sensor system may be attached or fixed to the monitored target system 901. Each of the sensors 111-1 to 111-N detects the monitored target and generates a stream of sensor signals representing vibration signals of the monitored target. The vibration signals 902 are detected by the sensor system 110 as sensor signals 112, and converted to trains of asynchronous input event streams 190 by a signal conversion module 120. The sensor signals 112 may be transmitted through wirelines or wireless connections. An embedding network 130 generates and outputs embedded encoding streams 139 to a decoding network 140 based on the input event streams 190. The embedding network 130 and the decoding network 140 form a cascade of neural networks and learn to reproduce reconstructed event streams 149 as a network reconstructed version of the input event streams 190. The detection module 150 compares the reproduced event streams 149 against the input event streams 190, and computes difference between the reproduced event streams 149 and the input event streams 190. The difference below a threshold represents no anomaly is detected, and the detection module 150 accordingly does not raise a trigger signal 180. If the difference is above a threshold, which represents anomaly is detected, then the detection module 150 accordingly raises a trigger signal 180.

An external system 200 may send signal 210 to the equipment anomaly detection system 100, to reset, configure and control the monitored target system 901 and the system 100. The external system 200 receives the trigger signal 180 and information about detected condition 170 associated with the anomaly detected. The trigger signal 180 and detected condition 170 may be transmitted through wirelines or wireless connections.

A learning configuration and control module 160 switches the system 100 between a learning state and a learned state.

An equipment anomaly detection device 101 includes the embedding network 130, the decoding network 140, the detection module 150, and the learning configuration and control module 160. In an embodiment, the device 101 may be packaged as an integrated circuit (IC), such as a system on a chip (SOC). In an alternative embodiment, the equipment anomaly detection device 101 may include the signal conversion module 120.

In an embodiment, the embedding network 130, the decoding network 140, the detection module 150, and the learning configuration and control module 160 may be implemented as computer executable instructions which when executed by a processor, performs the functions in the disclosure.

Figure 2:
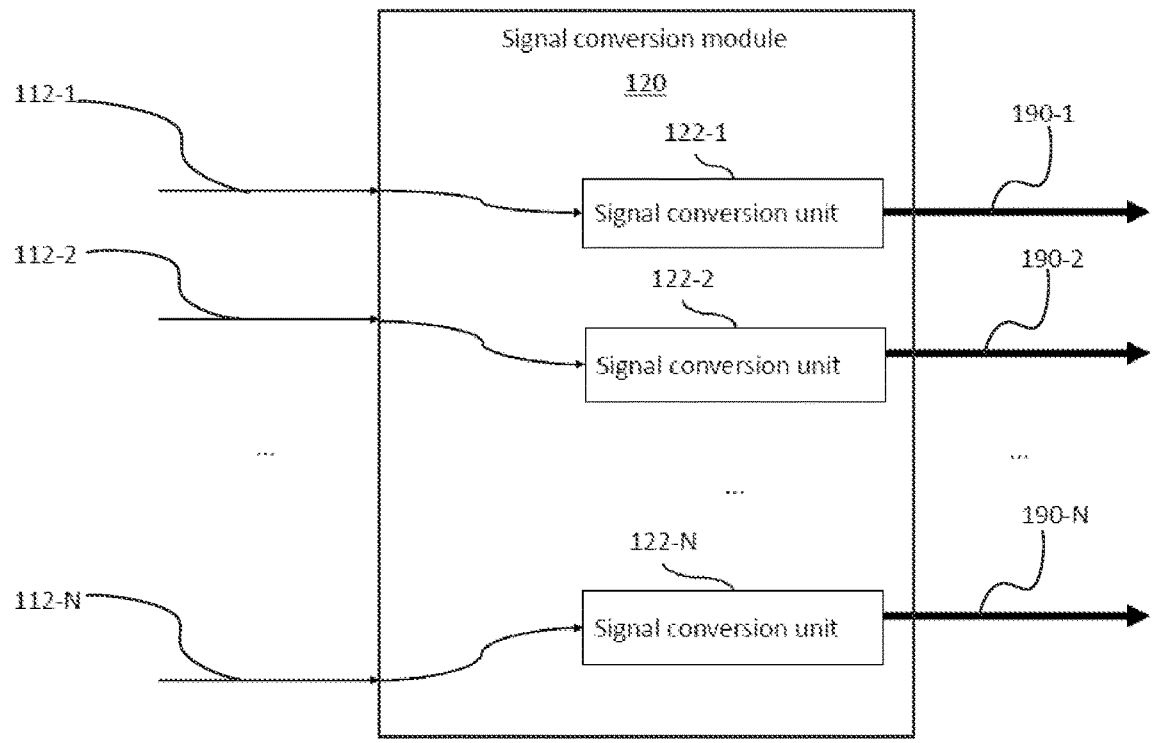
FIG. 2 is a schematic diagram showing a signal conversion module according to an embodiment of the present disclosure.

Signal Conversion Module Function:

With cross reference to FIG. 1 and FIG. 2, the sensors 111-1 to 111-N send multiple sensor signals 112-1, 112-2, . . . and 112-N to signal conversion units 122-1, 122-2, . . . and 122-N in the signal conversion module 120. Each of the input sensor signals 112-1, 112-2, . . . and 112-N is converted by one of signal conversion units 122-1, 122-2, . . . and 122-N into one of sensor event streams 190-1, 190-2, . . . and 190-N. Specifically, the input sensor signals 112 include sensor signals 112-1, 112-2, . . . and 112-N. The input event streams 190 include sensor event streams 190-1, 190-2, . . . and 190-N. The signal conversion unit 122-1 generates the sensor event stream 190-1 from input sensor signal 112-1. Similarly, the signal conversion unit 122-2 generates the sensor event stream 190-2 from input sensor signal 112-2. The signal conversion unit 122-N generates the sensor event stream 190-N from input sensor signal 112-N.

Each of the signal conversion units 122-1 to 122-N in the signal conversion module 120 performs the following functions, and an example of an input signal passing through a signal conversion unit is shown in the following.

Figure 3:
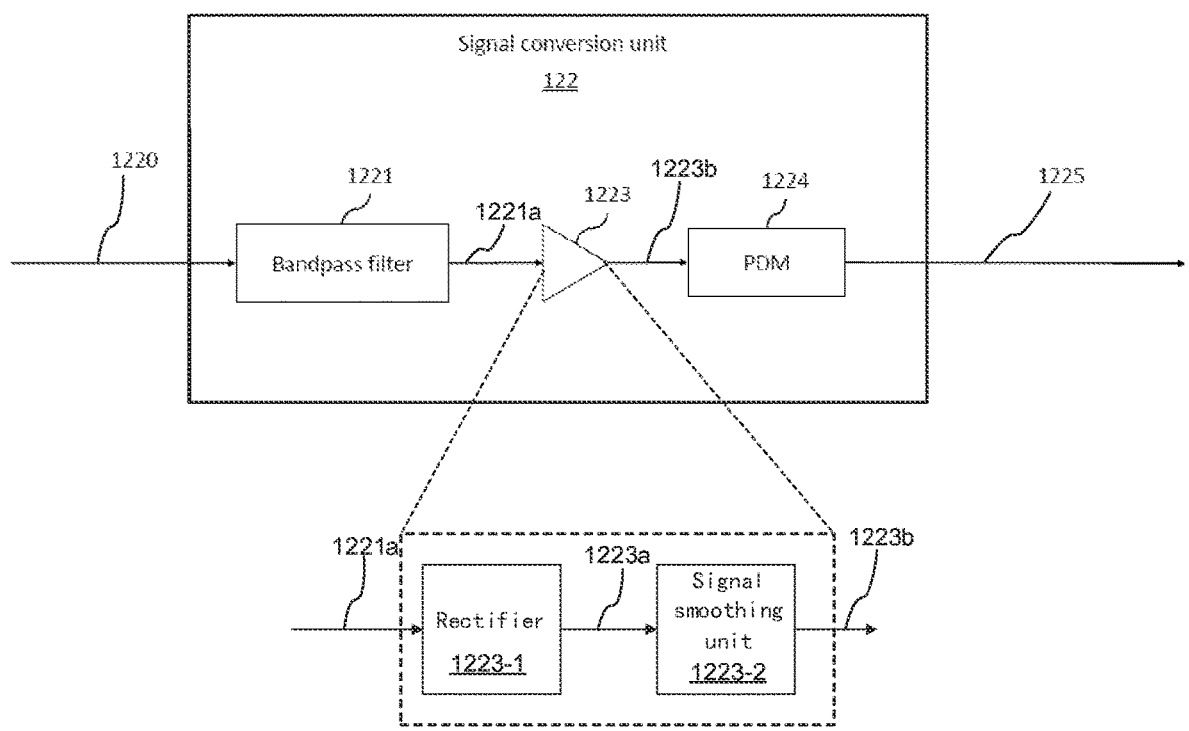
FIG. 3 is a schematic diagram showing a signal conversion unit according to an embodiment of the present disclosure.
Figure 4:
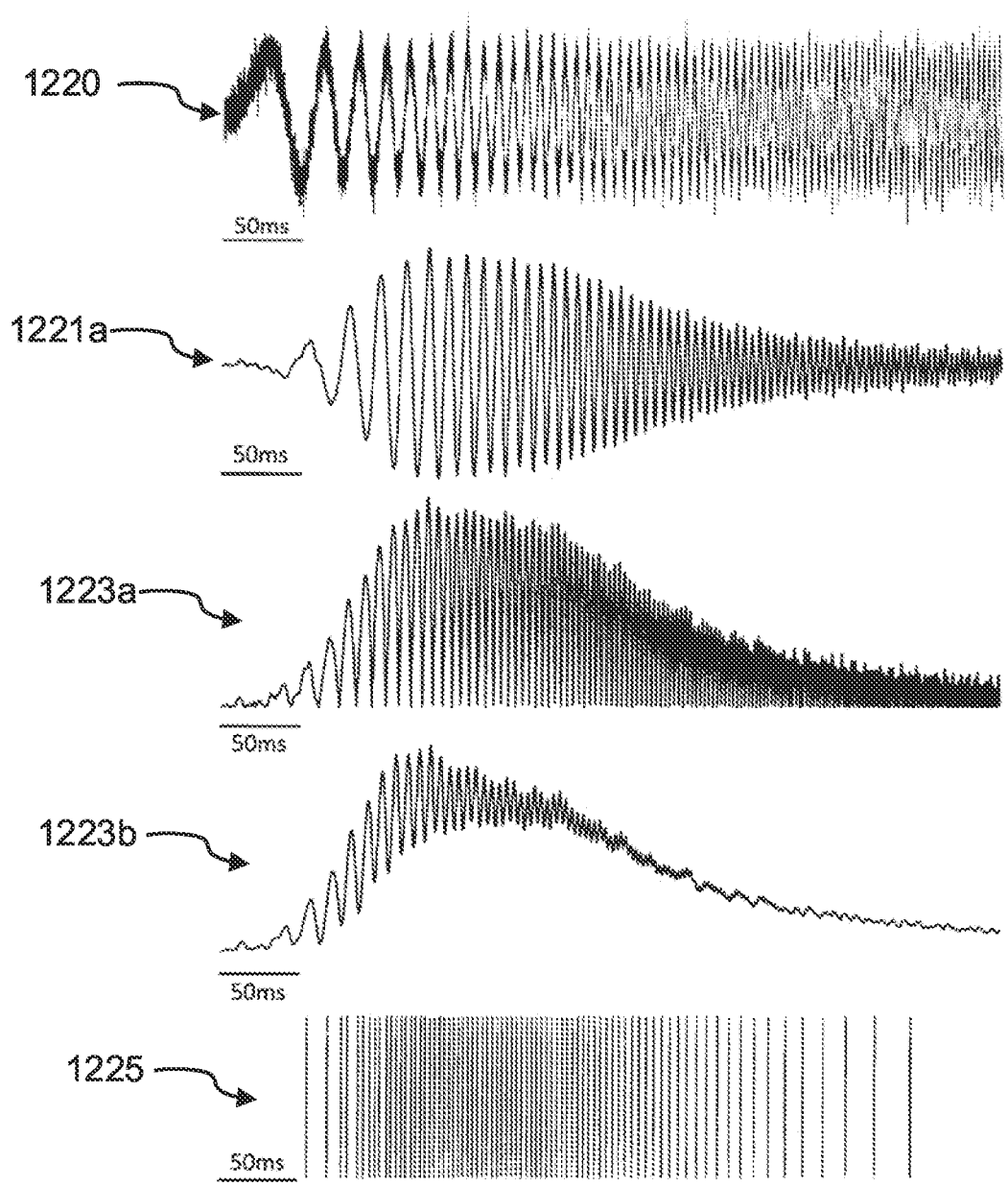
FIG. 4 is a schematic diagram showing signal waveforms during signal processing in the signal conversion unit according to an embodiment of the present disclosure.
Figure 5:
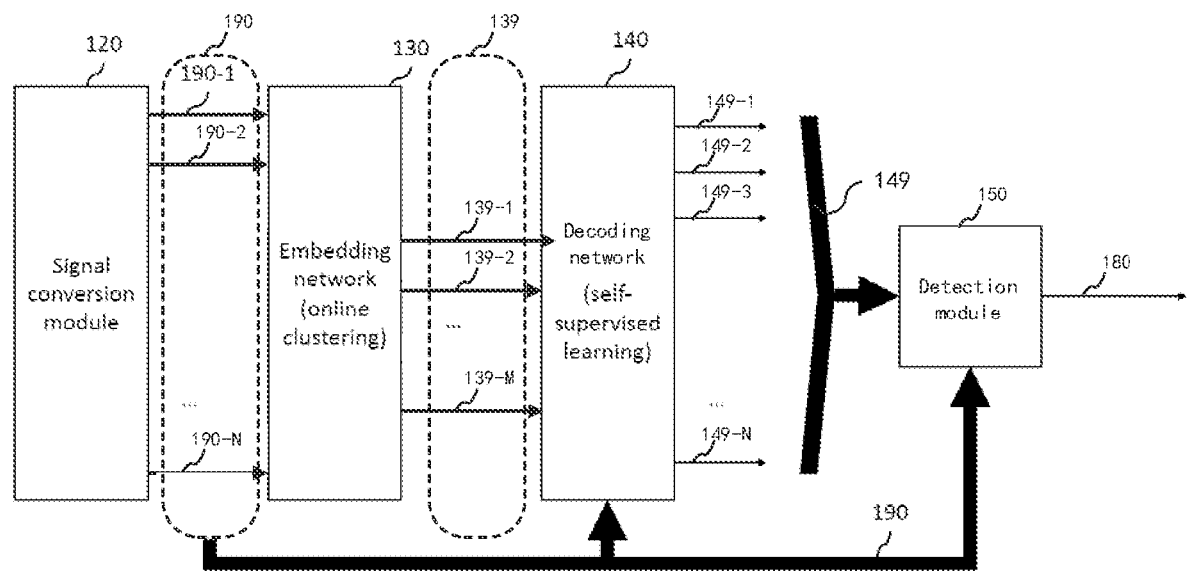
FIG. 5 is a schematic diagram showing connection from an input event stream to an embedding network and a detection module in the equipment anomaly detection system according to an embodiment of the present disclosure.

With cross-reference to FIG. 3, FIG. 4 and FIG. 5, a sensor in the sensor system 110 sends an input signal 1220 to a signal conversion unit 122. The signal conversion unit 122 may be an embodiment of each of the signal conversion units 122-1, 122-2, . . . and 122-N. The input signal 1220 represents one of the sensor signals 112-1, 112-2, . . . and 112-N, and event stream 1225 represents one of sensor event streams 190-1, 190-2, . . . and 190-N.

A bandpass filter 1221 with a chosen center frequency and bandwidth is used to select frequency components from the input signal 1220 and outputs the selected frequency components as filtered input signal 1221a. The input signal 1220 is sent to several bandpass filters, such that the input signal 1220 is separated into several frequency components.

The bandpass filtered signal 1221a is rectified and smoothened with a low-pass filter 1223. For example, the low-pass filter 1223 includes a rectifier 1223-1 and a signal smoothing unit 1223-2. The signal smoothing unit 1223-2 may be made from one or more capacitors. The rectifier 1223-1 generates a rectified signal 1223a from the filtered input signal 1221a. The signal smoothing unit 1223-2 generates a smooth rectified signal 1223b from the rectified signal 1223a.

The smooth rectified signal 1223b is encoded by pulse-density modulation (PDM) encoder 1224 using pulse-density modulation. For example, the PDM encoder 1224 may be a sigma-delta encoder. The PDM encoder 1224 generates the encoded smooth rectified signal 1223b as an event stream 1225. Each pulse in the event stream 1225 is transmitted as an event.

Network Architecture and Function:

The signal conversion module 120 emits a number of input event streams 190 which encode the input sensor signals as a number of event-coded signals in the selected frequency bands as described above.

The embedding network 130 learns to represent the high-dimensional input signals, such as N input event streams, in a lower-dimensional representation, such as M-dimensional representation, where M is a positive integer, and M<N. The embedding network 130 facilitates a particular pattern of input event streams 190 to be reliably mapped to a particular pattern of embedded encoding streams 139 at any given moment in time, which is based on an assumption that the event streams 190 being monitored exist in a small number of sub-states during the normal operation state of the monitored target. These sub-states represent a nominal condition of the monitored signals and the monitored target. The number of the possible normal sub-states can be chosen by changing the size of the M in the embedding network 130.

Embedding Network:

The disclosure presents at least two embodiment of the embedding network 130.

In one embodiment, the embedding network 130 includes a number of embedding neurons to implement an online-learning algorithm. In one embodiment, the embedding network 130 is a spiking neural network including a plurality of spiking neurons to implement an online-learning algorithm. An example of the proposed spiking neural network is basically an auto-encoder composed of an input layer, a hidden layer, and an output layer. The main differences with a classical auto-encoder are the following:

The embedding network 130 are trained through unsupervised learning. Training data are a small subset of the full data set, that supposedly do not contain any anomalies. The embodiment of the disclosure allows to learn an alternative representation of normal input signals by an encoder, that is the embedding network 130, and to accurately reconstruct normal input signals from such representation by a decoder, that is the decoding network 140. The basic principle behind is that the auto-encoder never learns to reconstruct abnormal signals. Thus, the reconstruction loss is small during normal conditions, and this loss is large in presence of abnormal signals since the auto encoder never learned to reconstruct abnormal signals. Such a training procedure allows detecting anomalies without defining what an anomaly is supposed to look like.

The output layer is twice the dimension of the input layer, whereas an output layer and an input layer in a classic auto-encoder have equal dimensions. The reason is that the reconstruction loss is the absolute difference between inputs and outputs. A single spiking neuron cannot perform the absolute value operation, but a pair of spiking neurons can.

Figure 6:
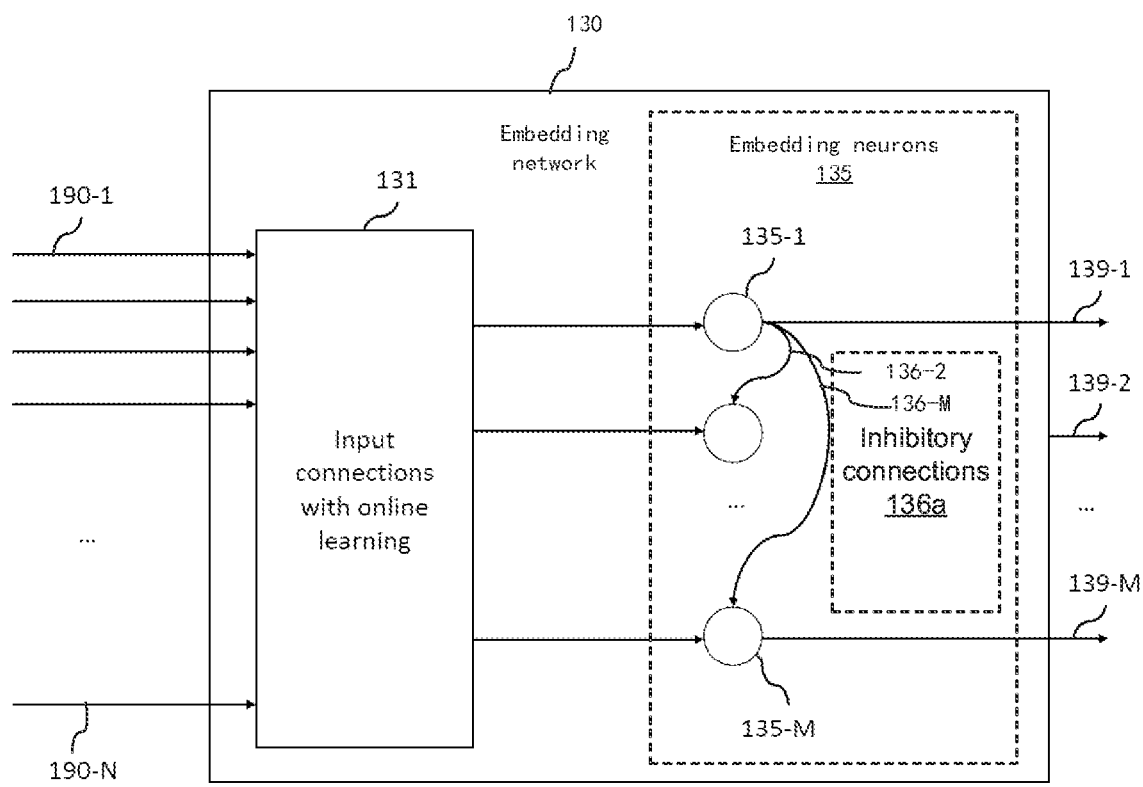
FIG. 6 is a schematic diagram showing an embedding network realizing a winner-takes-all (WTA) algorithm according to an embodiment of the present disclosure.

With reference to FIG. 6, an input connection with online learning 131 in the embedding network 130 combines the input event streams 190-1 to 190-N with a set of weights $W_I$ to provide signals to a set of embedding neurons 135, with $y(t)=W_I \cdot x(t)$, where $y(t)$ is the activity of the embedding neurons 135 and $x(t)$ is the activity of the input connections 131. That is, activity $y(t)$ represents the output of the embedding network, activity $x(t)$ represents the input of the embedding network. The activity $y(t)$ of the embedding neurons 135 becomes the embedded encoding streams 139 including embedded encoding streams 139-1 to 139-M.

The learning configuration and control module 160 uses an online learning rule to set the values in $W_I$. An example of the online learning rule is disclosed by Tetzlaff C., Kolodziejski, C., Timme, M., Tsodyks, M., Wörgötter, F. in an article entitled "Synaptic scaling enables dynamically distinct short- and long-term memory formation" in BMC neuroscience 14(1), P415 in 2013. For example, the learning configuration and control module 160 applies a rule according to Tetzlaff which updates the weights $W_I$ such that, $$\Delta w_{ij} = \eta (\int_{\Delta t} x_j(t) y_i(t) dt + \kappa (\int_{\Delta t} y_{tgt} - y_i(t) dt) w_{ij}^2); \quad (1)$$

$\Delta w_{ij}$ represents an adjustment to weight $w_{ij}$ in $W_I$;
$\eta$ represents a learning rate;
$\Delta t$ represents relative timing between the timing of a postsynaptic spike and timing of a presynaptic spike;
t represents time;
dt indicates the integral with respect to time;
$x_j(t)$ represents presynaptic traces in the input of the embedding network 130;

$y_i(t)$ represents postsynaptic traces in the input of the embedding network 130;

κ represents a postsynaptic learning rate;

$y_{tgt}$ represents a target postsynaptic firing rate;

$w_{ij}$ represents a weight applied to $x_j(t)$ for $y_i(t)=w_{ij} \cdot x_j(t)$.

In this embodiment, non-learned inhibitory connections between all embedding neurons, once a single embedding neuron begins to be active, suppress activities of all other neurons. This encourages a particular pattern of input events to be associated with the activity of a particular embedding neuron. That is, the embedding network 130 utilizes lateral inhibitory connections 136a between embedding neurons 135 of the embedding network 130 to perform a first type of winner-takes-all algorithm, such as a typical winner-takes-all (WTA) algorithm. The inhibitory connections 136a between neurons contain inhibitory connections 136-2 to 136-M.

Jonke, Z., Legenstein, R., Habenschuss, S., and Maass, W. disclose a learning rule in an article entitled "Feedback inhibition shapes emergent computational properties of cortical microcircuit motifs" in Journal of Neuroscience 37(35), 8511-8523 in 2017.

Figure 7:
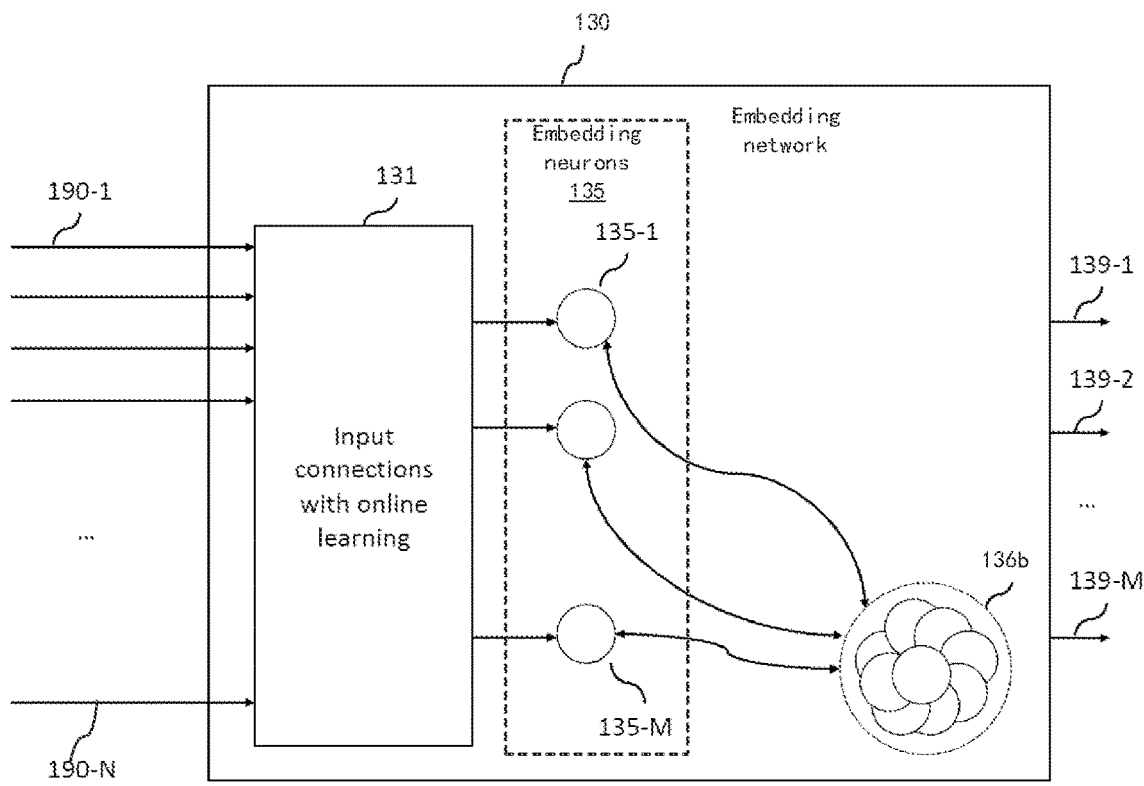
FIG. 7 is a schematic diagram showing an embedding network realizing a soft-winner-takes-all (sWTA) algorithm according to another embodiment of the present disclosure.

In another embodiment, FIG. 7 shows an embedding network 130 from FIG. 1 realizing a soft-winner-takes-all (sWTA) algorithm. The learning configuration and control module 160 from FIG. 1 uses a similar approach but adopts a learning rule according to Jonke to adapt the weights $W_I$. Under this rule, the learning configuration and control module 160 updates the weights $W_I$ such that:

$$\Delta w_{ij} = \begin{cases} \eta e^{-w_{ij}+1} x_j(t) & \text{if } \Delta t > 0 \\ -\eta y_i(t) & \text{if } \Delta t < 0 \end{cases};$$

$\Delta w_{ij}$ represents an adjustment to weight $w_{ij}$ in $W_I$;

η represents a learning rate;

e represents Euler's number;

Δt represents relative timing between the timing of a postsynaptic spike and timing of a presynaptic spike;

t represents time;

$x_j(t)$ represents the activity of the pre-synaptic neuron j;

$y_i(t)$ represents the activity of the post-synaptic neuron i;

$w_{ij}$ represents a weight applied to $x_j(t)$ for $y_i(t)=w_{ij} \cdot x_j(t)$.

In another embodiment, the embedding network 130 uses a population of inhibitory neurons 136b in the place of direct inhibitory connections between the embedding neurons 135. The inhibitory neurons receive input from all embedding neurons 135, and send inhibitory outputs to all embedding neurons 135. This network design permits several embedding neurons to be simultaneously active, and increases a number of embedding patterns that can be learned by the embedding network for a given number of embedding neurons. That is, the embedding network 130 utilizes a population of inhibitory connections between embedding neurons 135 of the embedding network 130 to perform a second type of winner-takes-all algorithm, such as a soft-winner-takes-all (sWTA) algorithm.

During the learning state of the system 100, the learning of the embedding network 130 is enabled. During the operation state of the system 100, the learning of the embedding network 130 is disabled.

Figure 8:
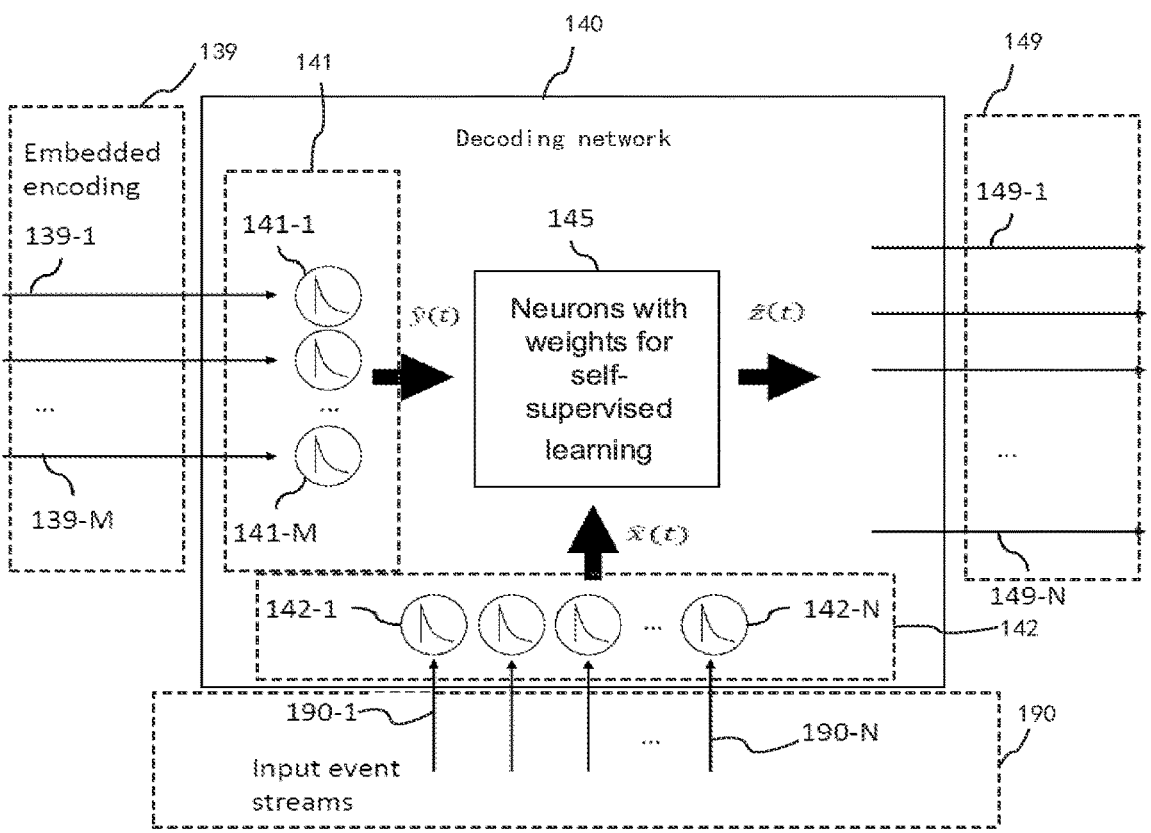
FIG. 8 is a schematic diagram showing a decoding network according to an embodiment of the present disclosure.

Decoding Network:

With reference to FIG. 8, the decoding network 140 is responsible for predicting the input signals based on the embedded encoding streams 139. The decoding network 140 filters the M nominal embedded encoding streams to obtain a filtered version $\hat{y}(t)$ of the M nominal embedded encoding streams, filters the N nominal sensor event streams to obtain a filtered version $\hat{x}(t)$ of the N nominal sensor event streams, and generates N nominal reconstructed event streams $\hat{z}(t)$ as the output of the decoding network based on a weighted combination of the filtered version $\hat{y}(t)$ of the M nominal embedded encoding streams, where $\hat{z}(t)=W_o \cdot \hat{y}(t)$.

Specifically, the embedded encoding streams 139 including embedded encoding streams 139-1 to 139-M are filtered with low-pass exponential filters 141-1 to 141-M in a low-pass exponential filter unit 141, and the input event streams 190 including the input event streams 190-1 to 190-N are filtered with low-pass exponential filters 142-1 to 142-N in a low-pass exponential filter unit 142. The filtered embedded encoding streams are referred to as $\hat{y}(t)$, and the filtered input event streams are referred to as $\hat{x}(t)$.

The decoding network 140 comprises neurons 145 with weights $W_o$ for self-supervised learning. The decoding network 140 uses the neurons 145 to generate reconstructed event streams 149 from the filtered embedded encoding streams 139. The reconstructed event streams 149 including reconstructed event streams 149-1 to 149-N are represented by $\hat{z}(t)$. The reconstructed event streams $\hat{z}(t)$ are generated by a weighted combination of the filtered embedded encoding streams $\hat{y}(t)$, such that $\hat{z}(t)=W_o \cdot \hat{y}(t)$. The decoding network in the learning state performs a self-supervised learning process to adjust the weight $W_o$ to reduce an error E, where $$E = \|W_o \cdot \hat{y}(t) - \hat{x}(t)\|^2 + \lambda \|W_o\|^2; \tag{3}$$

λ represents a regularization parameter for the ridge regression.

For example, a self-supervised learning process adjusts the weights $W_o$ to minimize the error E using a ridge-regression process or any other optimization approach. During the learning state of the system 100, the learning of the decoding network 140 is enabled. During the operation state of the system 100, the learning of the decoding network 140 is disabled.

Figure 9:
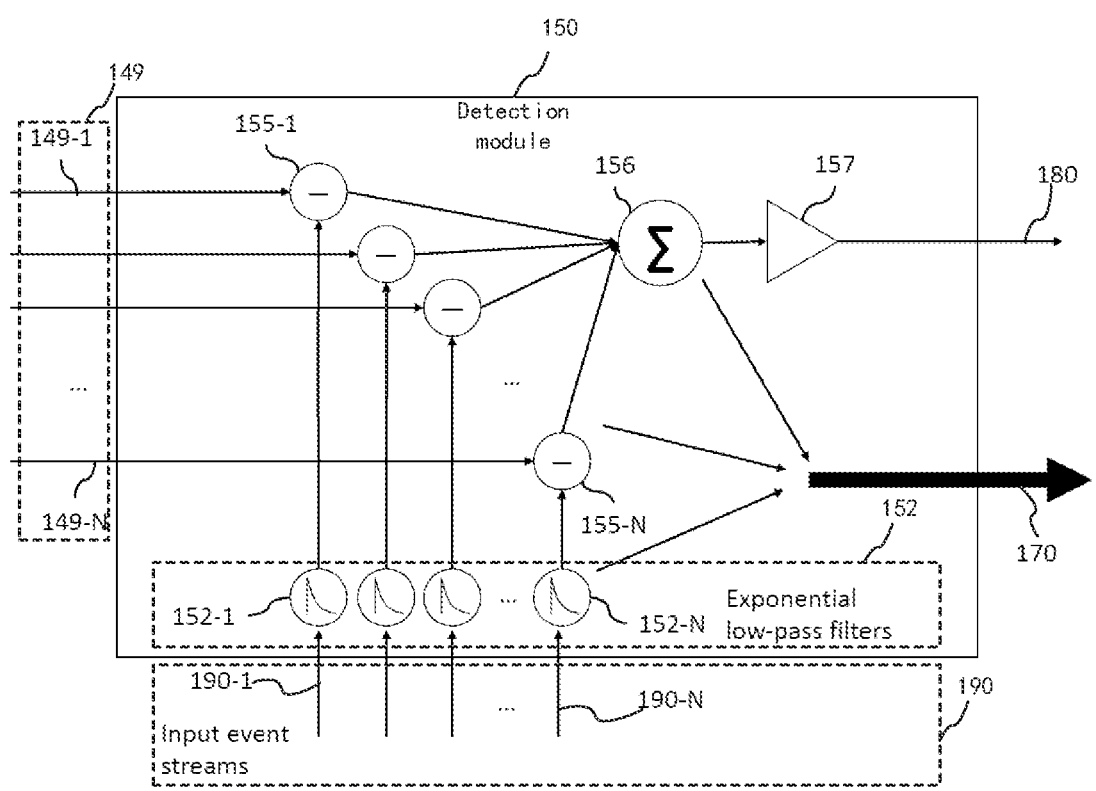
FIG. 9 is a schematic diagram showing a detection module according to an embodiment of the present disclosure.

Detection Module:

With reference to FIG. 9, the detector module 150 compares the reconstructed event streams 149 against the input event streams 190 after being filtered through the exponential low-pass filters 152. The exponential low-pass filters 152 include exponential low-pass filters 152-1 to 152-N. The detector module 150 comprises a subtraction calculator 155, a summation calculator 156, and a comparator 157. The subtraction calculator 155 includes a plurality of subtractors 155-1 to 155-N. Each of the subtractors 155-1 to 155-N computes the absolute difference $|\hat{z}_i - \hat{x}_i|$. The variable $\hat{z}_i$ represents one of the reconstructed event streams 149-1 to 149-N. The variable $\hat{x}_i$ represents a filtered version of one of input event streams 190-1 to 190-N output by one of the exponential low-pass filters 152. The results of each of the subtractors 155-1 to 155-N are combined in the summation unit 156 to generate a total difference, and the total difference is compared against a threshold by the comparator 157. Output of the comparator 157 indicates whether an anomaly is present or not.

Activity of the subtraction calculator 155, a summation calculator 156, and the input event streams 190 are collected as detected condition information 170 which can be requested by the external system 200. Connections between the modules 120, 130, 140, 150, and 160 may be implemented as wirelines, buses, cables, or fibers.

The external system 200 may include an on-site server located with the monitored target system 901 or a remote cloud based server located away from the monitored target system 901. Alternatively, the external system 200 may further include a portable device, such as a mobile phone, or a combination of the portable device and a server.

Neural networks in the disclosure may be implemented by a field programmable gate array (FPGA), an application-specific integrated circuit (ASIC), a tensor processing unit (TPU), a graphics processing unit (GPU), or a multi-core central processing unit (CPU).

Figure 10:
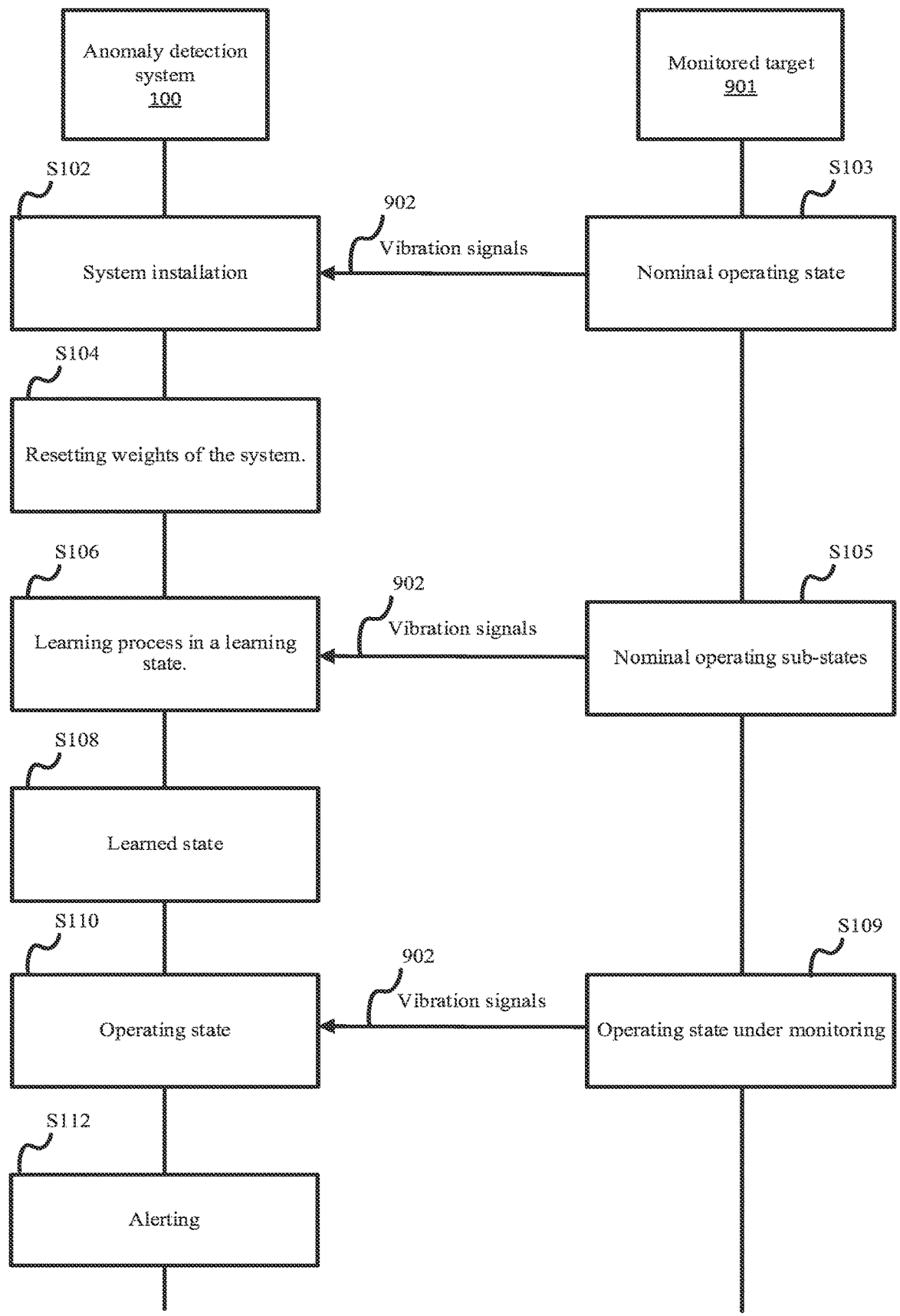
FIG. 10 is a schematic diagram showing operations of the equipment anomaly detection system according to an embodiment of the present disclosure.

System Function:

With reference to FIG. 10, a process for adapting and using the equipment anomaly detection system 100 to monitor signals is detailed in the following.

In step S102, the system 100 is installed and switched to the learning state to receive a set of vibration signals 902 from the monitored target system 901 when the monitored target system 901 operates in a nominal operating state in step S103.

In step S104, the system 100 is reset, such that the embedding network 130 has random weights $W_I$, the decoding network 140 has random weights $W_o$, and learning of the embedding network 130 and the decoding network 140 is switched on. The detection trigger is disabled.

In step S105, the monitored target is allowed to operate in the known nominal operating state which may include a plurality of nominal operating sub-states. In step S106, the system 100 in the learning state adapts and learns this nominal state by adjusting weights $W_I$ and weights $W_o$ according to the learning rules. This adaptation also known as the learning process of the system 100 is complete when the detection module indicates no anomaly over all normal operation sub-states of the monitored target. The system 100 can be configured to control the duration of this adaptation process.

In step S108, when the learning of the system 100 completes, and the system 100 transits from the learning state to a learned state, where each of the embedding network 130 and the decoding network 140 also transits from a learning state to a learned state. The weights $W_I$ of the embedding network 130 and the weights $W_o$ of the decoding network 140 are updated during the learning state and fixed in the learned state. The learned state of the embedding network 130 is referred to as a trained embedding network state of the embedding network 130. The learned state of the decoding network 140 is referred to as a trained decoding network state of the decoding network 140.

In step S109, the monitored target system 901 works in an operating state under monitoring by the system 100.

In step S110, the system 100 in the operation state operates continuously with the embedding network 130 and the decoding network 140 in the learned state as described above. The system 100 determines whether an anomaly of the monitored target is detected. The detection module 150 is configured to raise a detection trigger 180 when detecting an anomaly for a desired period, such as one minute.

In step S112, when detecting an anomaly of the monitored target system 901, the detection module 150 sends the trigger signal 180 to the external system 200, which may for example wake the external system 200. The external system 200 may sent control signals 210 to the system 100 to request detailed information 170 about the anomaly. The detected condition information 170 may then be communicated to the external system 200. The trigger signal 180, the control signals 210, and the detected condition information 170 may be transmitted through wirelines or wireless connections.

Figure 11:
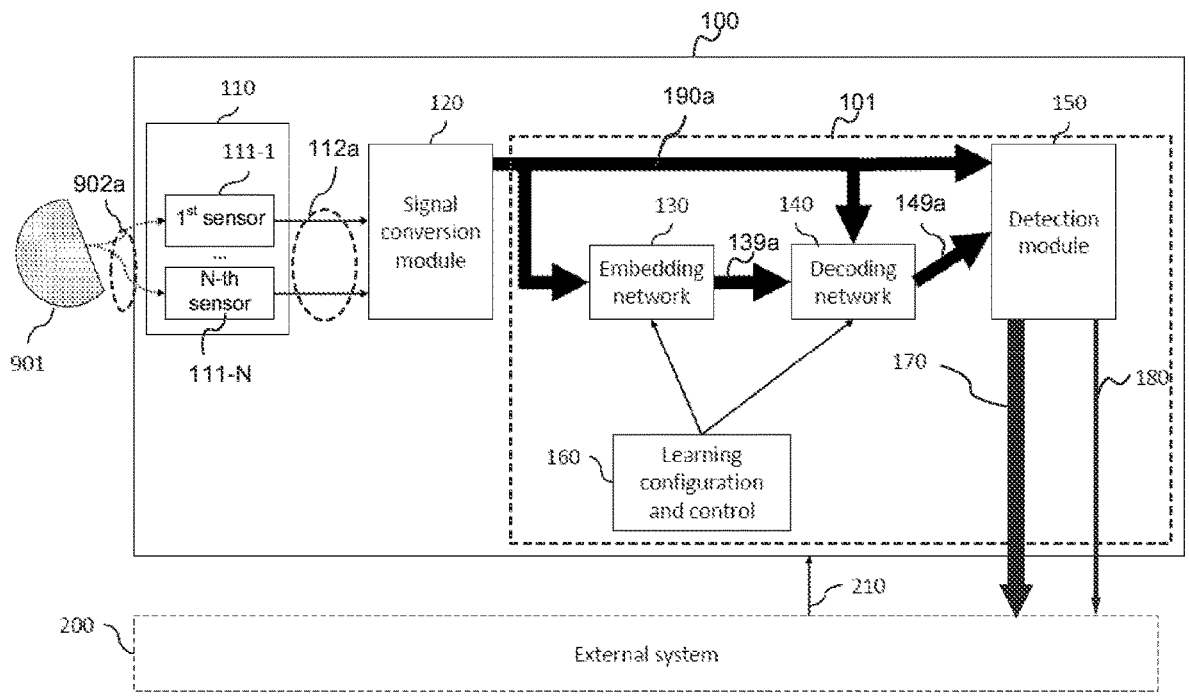
FIG. 11 is a schematic diagram showing the equipment anomaly detection system in a learning state.
Figure 12:
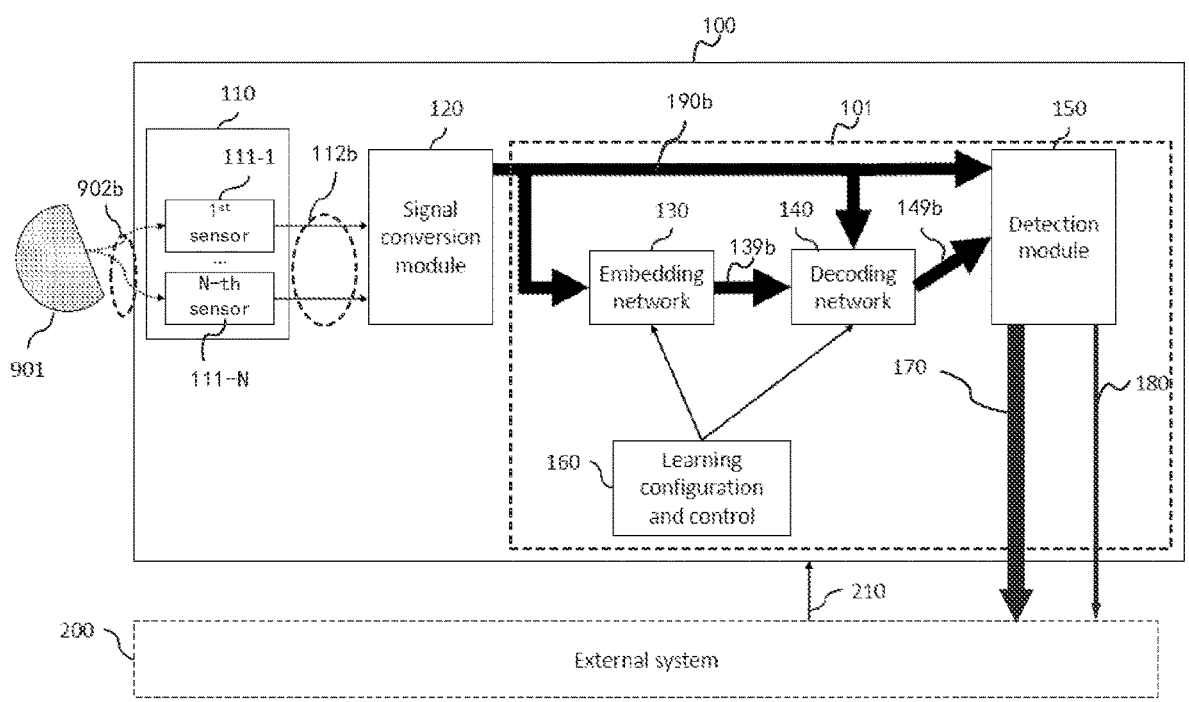
FIG. 12 is a schematic diagram showing the equipment anomaly detection system in an operation state.

Examples of System Operations in the Learning State:

With reference to FIG. 11 and FIG. 12, the learning configuration and control module 160 switches the system 100 between a learning state and a learned state. Examples of the vibration signals 902, input sensor signals 112, input event streams 190, embedded encoding streams 139, and reconstructed event streams 149 are shown in a following Table 1.

TABLE 1

| | Learning state | Learned state |
|---|---|---|
| Vibration signals 902 | Nominal vibration signals 902a | Monitored vibration signals 902b |
| Input sensor signals 112 | N nominal sensor signal streams 112a | N monitored sensor signal streams 112b |
| Input event streams 190 | N nominal sensor event streams 190a | N monitored sensor event streams 190b |
| Embedded encoding streams 139 | M nominal embedded encoding streams 139a | M monitored embedded encoding streams 139b |
| Reconstructed event streams 149 | N nominal reconstructed event streams 149a | N monitored reconstructed event streams 149b |

In the learning state, the system 100 respectively processes nominal vibration signals 902a, N nominal sensor signal streams 112a, N nominal sensor event streams 190a, M nominal embedded encoding streams 139a, and N nominal reconstructed event streams 149a as vibration signals 902, input sensor signals 112, input event streams 190, embedded encoding streams 139, and reconstructed event streams 149. In the learned state, the system 100 respectively processes monitored vibration signals 902b, N monitored sensor signal streams 112b, N monitored sensor event streams 190b, M monitored embedded encoding streams 139b, and N monitored reconstructed event streams 149b as vibration signals 902, input sensor signals 112, input event streams 190, embedded encoding streams 139, and reconstructed event streams 149.

With reference to FIG. 11, the sensor system 110 generates N nominal sensor signal streams 112a from nominal vibration signals 902a. The signal conversion module 120 for receives, filters, rectifies, smoothens and analog to digital converts the N nominal sensor signal streams 112a into N nominal sensor event streams 190a.

In the learning state of the equipment anomaly detection system 100, the embedding network 130 and the decoding network 140 form a cascade of neural networks for receiving and learning the N nominal sensor event streams 190a from N event stream input connections to form a learned state of the cascade of neural networks.

The embedding network 130 is a spiking neural network for receiving the N nominal sensor event streams 190a from the N event stream input connections as input of the embedding network 130 in the learning state, and outputting M nominal embedded encoding streams 139a as the output of the embedding network 130 based on the N nominal sensor event streams 190a. The N is an integer greater than the integer M. The embedding network 130 learns to generate the output of the embedding network 130 from the input of the embedding network 130 and to form a trained embedding network state of the embedding network 130 using spike-timing dependent plasticity (STDP). The embedding network 130 may learn from the N nominal sensor event streams 190a by updating the weights $W_I$ according to a learning rule associated with the formula (1) or (2).

Figure 13:
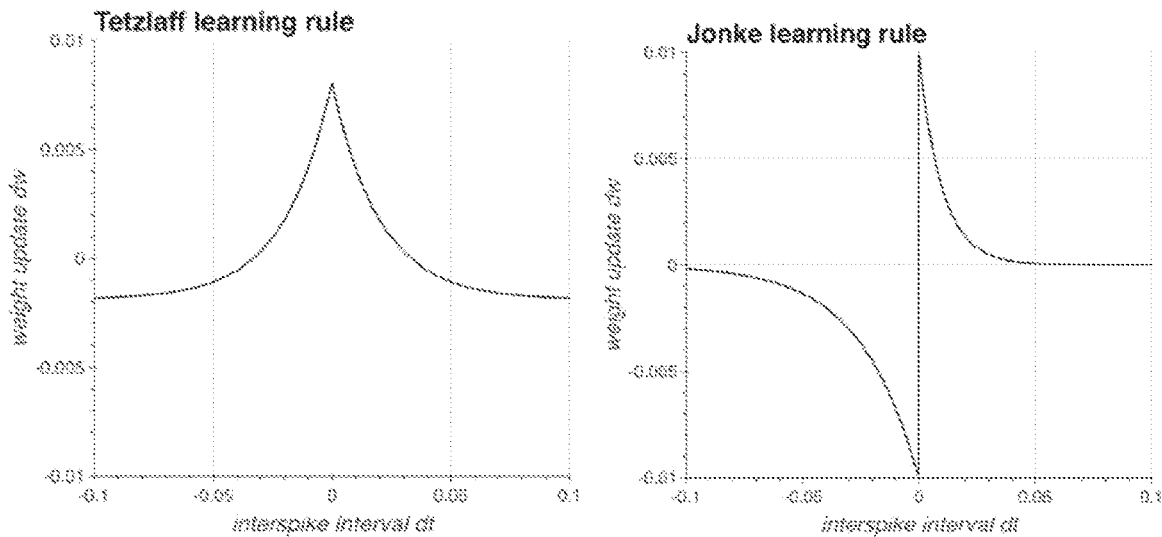
FIG. 13 is a schematic diagram showing a Tetzlaff learning rule and a Jonke learning rule.

The embedding network 130 learns to generate the output of the embedding network 130 from the input of the embedding network and to form the trained embedding network state of the embedding network 130 using STDP with a symmetric learning window or STDP with an asymmetric learning window. FIG. 13 shows a Tetzlaff learning rule as an example of the symmetric learning window and a Jonke learning rule as an example of the asymmetric learning window.

The decoding network 140 is a neural network for receiving the M nominal embedded encoding streams 139a as input of the decoding network 140 in the learning state, and outputting N nominal reconstructed event streams 149a as the output of the decoding network 140 based on the M nominal embedded encoding streams 139a. The decoding network 140 learns to generate the output of the decoding network 140 from the input of the decoding network 140 and to form a trained decoding network state of the decoding network 140 based on a rule to reduce the difference between the N nominal reconstructed event streams 149a and the N nominal sensor event streams 190a. The decoding network 140 may learn from the M nominal embedded encoding streams 139a by updating the weights $W_o$ according to a learning rule associated with the formula (3).

The decoding network 140 filters the M nominal embedded encoding streams 139a to obtain a filtered version $\hat{y}(t)$ of the M nominal embedded encoding streams 139a, filters the N nominal sensor event streams 190a to obtain a filtered version $\hat{x}(t)$ of the N nominal sensor event streams 190a, and generates N nominal reconstructed event streams $\hat{z}(t)$ as output of the decoding network 140 based on weighted combination of the filtered version $\hat{y}(t)$ of the M nominal embedded encoding streams 139a, where $\hat{z}(t)=W_o \cdot \hat{y}(t)$. The decoding network 140 in the learning state performs a self-supervised learning process to adjust the weight $W_o$ to reduce an error $E=\|W_o \cdot \hat{y}(t)-\hat{x}(t)\|^2+\lambda\|W_o\|^2$.

Examples of System Operations in the Operation State:

With reference to FIG. 12, the sensor system 110 generates N monitored sensor signal streams 112b from monitored vibration signals 902b. The signal conversion module 120 receives, filters, rectifies, smoothens and analog to digital converts the N monitored sensor signal streams 112b into the N monitored sensor event streams 190b.

In an operation state, the cascade of neural networks in the learned state receives N monitored sensor event streams 190b from the N event stream input connections as input of the cascade of neural networks, and outputs N monitored reconstructed event streams 149b as output of the cascade of neural networks based on the N monitored sensor event streams 190b. The N monitored reconstructed event streams 149b represent a reconstructed version of the N monitored sensor event streams 190b.

The embedding network 130 in the trained embedding network state outputs M monitored embedded encoding streams 139b based on the N monitored sensor event streams 190b.

The decoding network 140 in the trained decoding network state outputs the N monitored reconstructed event streams 149b based on the M monitored embedded encoding streams 139b.

The detection module 150 calculates difference between the N monitored sensor event streams 190b and the N monitored reconstructed event streams 149b, and sends the detection trigger 180 when the difference between N monitored sensor event streams 190b and N monitored reconstructed event streams 149b exceeds a threshold difference value.

The decoding network 140 in the trained decoding network state filters the M monitored embedded encoding streams 139b to obtain a filtered version $\hat{y}_m(t)$ of the M monitored embedded encoding streams 139b, filters the N monitored sensor event streams 190b to obtain a filtered version $\hat{x}_m(t)$ of the N monitored sensor event streams 190b, and generates N monitored reconstructed event streams $\hat{z}_m(t)$ as the output of the decoding network 140 based on a weighted combination of the filtered version $\hat{y}_m(t)$ of the M monitored embedded encoding streams 139b, and $\hat{z}_m(t)=W_o \cdot \hat{y}_m(t)$.

The detection module 150 filters the N monitored sensor event streams 190b to obtain a filtered version $\hat{x}_m(t)$ of the N monitored sensor event streams 190b. The detection module 150 comprises the subtraction calculator 155, the summation calculator 156, and the comparator 157.

The subtraction calculator 155 includes a plurality of subtractors. A subtractor selected from the plurality of subtractors calculates reconstruction induced difference between a monitored sensor event stream in a filtered version $\hat{x}_m(t)$ of the N monitored sensor event streams 190b and a monitored reconstructed event stream in the N monitored reconstructed event streams $\hat{z}_m(t)$, such that the plurality of subtractors calculate reconstruction induced differences stream by stream between the filtered version $\hat{x}_m(t)$ of the N monitored sensor event streams 190b and the N monitored reconstructed event streams $\hat{z}_m(t)$.

The summation calculator 156 calculates the summation of the differences between the filtered version $\hat{x}_m(t)$ and the N monitored reconstructed event streams $\hat{z}_m(t)$.

The comparator 157 compares the summation with a signal difference threshold, and outputs an alert signal 180 representing anomaly of the N monitored sensor event streams 190b when the summation exceeds the signal difference threshold.

Figure 14:
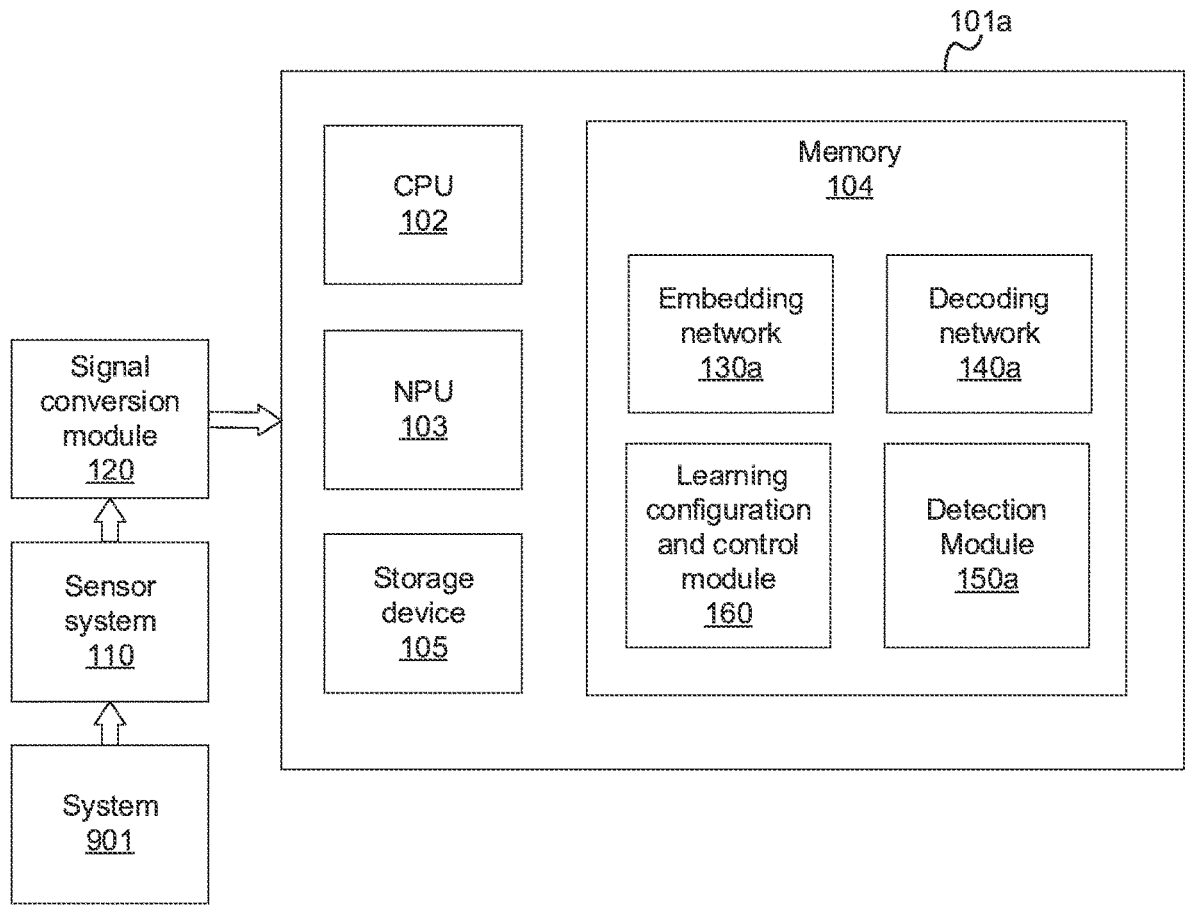
FIG. 14 is a schematic diagram showing software modules of an equipment anomaly detection system according to an embodiment of the present disclosure.

With reference to FIG. 14, in an embodiment, the embedding network 130, the decoding network 140, the detection module 150, and the learning configuration and control module 160 may be implemented as computer executable instructions in an embedding network module 130a, the decoding network module 140a, the detection module 150a, and the learning configuration and control module 160a. The computer executable instructions in module 130a, 140a, 150a, and 160a, which when loaded from a storage device 105 to a main memory 104 and executed by a CPU 102, performs the functions of the embedding network 130, the decoding network 140, the detection module 150, and the learning configuration and control module 160 in the disclosure. The CPU 102 may use a neural processing unit (NPU) 103 to execute functions of the embedding network module 130a and the decoding network module 140a. The NPU 103 may be implemented by a field programmable gate array (FPGA), an application-specific integrated circuit (ASIC), a tensor processing unit (TPU), or a graphics processing unit (GPU).

A person having ordinary skill in the art understands that each of the modules, units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated into one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The equipment anomaly detection device of the disclosure uses unsupervised or self-supervised neural networks to learn nominal conditions of a target system, such as a device or a machine. The trained neural networks can reproduce sensory signals of the target system as a neural-network-reconstructed version of the sensory signals in the nominal conditions of a target system. The equipment anomaly detection device may analyze and predict operation conditions of the target system based on the neural-network-reconstructed version exceed a certain level. When signal difference between the sensory signals and the neural-network-reconstructed version exceeds a certain level, the equipment anomaly detection device may issue an alert signal to reflect abnormal operation conditions of the target system, which may be a period ahead of an actual onset of system failure of the target system.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. An equipment anomaly detection system (100) comprising:
    a signal conversion module (120) for receiving, filtering, rectifying, and analog to digital converting N nominal sensor signal streams into N nominal sensor event streams, and N monitored sensor signal streams into N monitored sensor event streams;
    wherein the signal conversion module (120) comprises a bandpass filter (1221) to filter an input signal, a low-pass filter (1223) to rectify and smooth the bandpass-filtered input signal, and a PDM encoder (1224) to encode the smoothed, rectified input signal into an event stream;
    a cascade of neural networks for receiving and learning N nominal sensor event streams (190a) from N event stream input connections in a learning state to form a learned state of the cascade of neural networks, and
    a detection module (150, 150a) for calculating difference between the N monitored sensor event streams (190b) and the N monitored reconstructed event streams (149b);
    wherein the equipment anomaly detection system (100) is characterized by:
    the cascade of neural networks in the learned state receives N monitored sensor event streams (190b) from the N event stream input connections as input of the cascade of neural networks in an operation state, and outputs N monitored reconstructed event streams (149b) as output of the cascade of neural networks based on the N monitored sensor event streams (190b), and the N monitored reconstructed event streams (149b) represent a reconstructed version of the N monitored sensor event streams (190b); and
    the detection module (150, 150a) sends a detection trigger (180) when the difference between N monitored sensor event streams (190b) and N monitored reconstructed event streams (149b) exceeds a threshold difference value;
    wherein the cascade of neural networks comprises: an embedding network (130) being a spiking neural network for receiving the N nominal sensor event streams (190a) from the N event stream input connections as input of the embedding network (130) in the learning state, and outputting M nominal embedded encoding streams (139) as output of the embedding network (130) based on the N nominal sensor event streams (190a), wherein N is an integer greater than the integer M, and the embedding network (130) learns to generate the output of the embedding network (130) from the input of the embedding network (130) and to form a trained embedding network state of the embedding network (130) using spike-timing dependent plasticity (STDP); and a decoding network (140) being a neural network for receiving the M nominal embedded encoding streams (139) as input of the decoding network (140) in the learning state, and outputting N reconstructed event streams as output of the decoding network (140) based on the M nominal embedded encoding streams (139), wherein the decoding network (140) learns to generate the output of the decoding network (140) from the input of the decoding network (140) and to form a trained decoding network state of the decoding network (140) based on a rule to reduce difference between the N reconstructed event streams and the N nominal sensor event streams (190a);

wherein the embedding network (130) in the trained embedding network state outputs M monitored embedded encoding streams (139b) based on the N monitored sensor event streams (190b); and the decoding network (140) in the trained decoding network state outputs the N monitored reconstructed event streams (149b) based on the M monitored embedded encoding streams (139b);

wherein the decoding network filters the M nominal embedded encoding streams by utilizing exponential low-pass filters to obtain a filtered version ŷ(t) of the M nominal embedded encoding streams, filters the N nominal sensor event streams by utilizing exponential low-pass filters to obtain a filtered version x̂(t) of the N nominal sensor event streams, and generates N nominal reconstructed event streams ẑ(t) as output of the decoding network based on weighted combination of the filtered version ŷ(t) of the M nominal embedded encoding streams with weights $W_o$, namely ẑ(t)=$W_o$·ŷ(t), and the decoding network in the learning state performs a self-supervised learning process to adjust the weights $W_o$ to reduce an error E=$\|W_o·ŷ(t)−x̂(t)\|^2+λ.81\ W_o\|^2$, where λ represents a regularization parameter for ridge regression;

wherein the decoding network in the trained decoding network state filters the M monitored embedded encoding streams to obtain a filtered version $ŷ_m(t)$ of the M monitored embedded encoding streams, filters the N monitored sensor event streams to obtain a filtered version $ẑ_m(t)$ of the N monitored sensor event streams, and generates N monitored reconstructed event streams $ẑ_m(t)$ as output of the decoding network based on weighted combination of the filtered version $ŷ_m(t)$ of the M monitored embedded encoding streams, and $ẑ_m(t)=W_o·ŷ_m(t)$; the detection module filters the N monitored sensor event streams to obtain a filtered version $x̂_m(t)$ of the N monitored sensor event streams, and the detection module comprises: a subtraction calculator comprising a plurality of subtractors, wherein a subtractor selected from the plurality of subtractors calculates a reconstruction induced difference between a monitored sensor event stream in filtered version $x̂_m(t)$ of the N monitored sensor event streams and a monitored reconstructed event stream in the N monitored reconstructed event streams $ẑ_m(t)$, such that the plurality of subtractors calculate reconstruction induced differences stream by stream between the filtered version $x̂_m(t)$ of the N monitored sensor event streams and the N monitored reconstructed event streams $ẑ_m(t)$; a summation calculator for calculating summation of the differences between the filtered version $x̂_m(t)$ and the N monitored reconstructed event streams $ẑ_m(t)$; and a comparator for comparing the summation with a signal difference threshold, and outputting an alert signal representing anomaly of the N monitored sensor event streams when the summation exceeds the signal difference threshold.

2. The equipment anomaly detection system (100) of claim 1, characterized in that the embedding network (130) learns to generate the output of the embedding network (130) from the input of the embedding network (130) and to form the trained embedding network state of the embedding network (130) using STDP with a symmetric learning window.

3. The equipment anomaly detection system (100) of claim 1, characterized in that the embedding network (130) learns to generate the output of the embedding network (130) from the input of the embedding network (130) and to form the trained embedding network state of the embedding network (130) using STDP with an asymmetric learning window.

4. The equipment anomaly detection (100) of claim 1, characterized in that the embedding network (130) utilizes inhibitory connections (136a) between embedding neurons (135) of the embedding network (130) to perform a first type of winner-takes-all algorithm.

5. The equipment anomaly detection (100) of claim 1, characterized in that the embedding network (130) utilizes a population of inhibitory connections (136b) between embedding neurons (135) of the embedding network (130) to perform a second type of winner-takes-all algorithm.

6. The equipment anomaly detection (100) of claim 1, characterized in that the decoding network (140) in the learning state uses a ridge-regression process to minimize the error E.

7. A method for equipment anomaly detection, comprising using a signal conversion module (120) to receive, filter, rectify, and analog to digital convert N nominal sensor signal streams into N nominal sensor event streams, and N monitored sensor signal streams into N monitored sensor event streams;

using a cascade of neural networks to receive and learn N nominal sensor event streams (190a) from N event stream input connections in a learning state to form a learned state of the cascade of neural networks, and using a detection module (150, 150a) to calculate difference between the N monitored sensor event streams (190b) and N monitored reconstructed event streams (149b), the detection module being characterized by:

the cascade of neural networks in the learned state receives N monitored sensor event streams (190b) from the N event stream input connections as input of the cascade of neural networks in an operation state, and outputs N monitored reconstructed event streams (149b) as output of the cascade of neural networks based on the N monitored sensor event streams (190b), and the N monitored reconstructed event streams (149b) represent a reconstructed version of the N monitored sensor event streams (190b); and the detection module (150, 150a) sends a detection trigger (180) when the difference between N monitored sensor event streams (190b) and N monitored reconstructed event streams (149b) exceeds a threshold difference value;

wherein the signal conversion module (120) comprises a bandpass filter (1221) to filter an input signal and a low-pass filter (1223) to rectify and smooth the bandpass-filtered signal and a PDM encoder (1224) to encode the smoothed, rectified signal into an event stream;

wherein the cascade of neural networks comprises: an embedding network (130) being a spiking neural network for receiving the N nominal sensor event streams (190a) from the N event stream input connections as input of the embedding network (130) in the learning state, and outputting M nominal embedded encoding streams (139) as output of the embedding network (130) based on the N nominal sensor event streams (190a), wherein N is an integer greater than the integer M, and the embedding network (130) learns to generate the output of the embedding network (130) from the input of the embedding network (130) and to form a trained embedding network state of the embedding network (130) using spike-timing dependent plasticity (STDP); and a decoding network (140) being a neural network for receiving the M nominal embedded encoding streams (139) as input of the decoding network (140) in the learning state, and outputting N reconstructed event streams as output of the decoding network (140) based on the M nominal embedded encoding streams (139), wherein the decoding network (140) learns to generate the output of the decoding network (140) from the input of the decoding network (140) and to form a trained decoding network state of the decoding network (140) based on a rule to reduce difference between the N reconstructed event streams and the N nominal sensor event streams (190a);

wherein the embedding network (130) in the trained embedding network state outputs M monitored embedded encoding streams (139b) based on the N monitored sensor event streams (190b); and the decoding network (140) in the trained decoding network state outputs the N monitored reconstructed event streams (149b) based on the M monitored embedded encoding streams (139b); wherein the decoding network filters the M nominal embedded encoding streams by utilizing exponential low-pass filters to obtain a filtered version $\hat{y}(t)$ of the M nominal embedded encoding streams, filters the N nominal sensor event streams by utilizing exponential low-pass filters to obtain a filtered version (t) of the N nominal sensor event streams, and generates N nominal reconstructed event streams $\hat{z}(t)$ as output of the decoding network based on weighted combination of the filtered version $\hat{y}(t)$ of the M nominal embedded encoding streams with weights $W_o$, namely $\hat{z}(t)=W_o \cdot \hat{y}(t)$, and the decoding network in the learning state performs a self-supervised learning process to adjust the weights $W_o$ to reduce an error $E=\|W_o \cdot \hat{y}(t)-\hat{x}(t)\|^2 + \lambda \|W_o\|^2$, where $\lambda$ represents a regularization parameter for ridge regression;

wherein the decoding network in the trained decoding network state filters the M monitored embedded encoding streams to obtain a filtered version $\hat{y}_m(t)$ of the M monitored embedded encoding streams, filters the N monitored sensor event streams to obtain a filtered version $\hat{z}_m(t)$ of the N monitored sensor event streams, and generates N monitored reconstructed event streams $\hat{z}_m(t)$ as output of the decoding network based on weighted combination of the filtered version $\hat{y}_m(t)$ of the M monitored embedded encoding streams, and $\hat{z}_m(t)=W_o \cdot \hat{y}_m(t)$; the detection module filters the N monitored sensor event streams to obtain a filtered version $\hat{z}_m(t)$ of the N monitored sensor event streams, and the detection module comprises: a subtraction calculator comprising a plurality of subtractors, wherein a subtractor selected from the plurality of subtractors calculates a reconstruction induced difference between a monitored sensor event stream in filtered version $\hat{x}_m(t)$ of the N monitored sensor event streams and a monitored reconstructed event stream in the N monitored reconstructed event streams $\hat{z}_m(t)$, such that the plurality of subtractors calculate reconstruction induced differences stream by stream between the filtered version $\hat{x}_m(t)$ of the N monitored sensor event streams and the N monitored reconstructed event streams $\hat{z}_m(t)$; a summation calculator for calculating summation of the differences between the filtered version $\hat{x}_m(t)$ and the N monitored reconstructed event streams $\hat{z}_m(t)$; and a comparator for comparing the summation with a signal difference threshold, and outputting an alert signal representing anomaly of the N monitored sensor event streams when the summation exceeds the signal difference threshold.

8. The method of claim 7, characterized in that the embedding network (130) learns to generate the output of the embedding network (130) from the input of the embedding network (130) and to form the trained embedding network state of the embedding network (130) using STDP with a symmetric learning window.

9. The method of claim 7, characterized in that the embedding network (130) learns to generate the output of the embedding network (130) from the input of the embedding network (130) and to form the trained embedding network state of the embedding network (130) using STDP with an asymmetric learning window.

10. The method of claim 7, characterized in that the embedding network (130) utilizes lateral inhibitory connections (136a) between embedding neurons (135) of the embedding network (130) to perform a first type of winner-takes-all algorithm.

11. The method of claim 7, characterized in that the embedding network (130) utilizes a population of inhibitory connections (136b) between embedding neurons (135) of the embedding network (130) to perform a second type of winner-takes-all algorithm.

* * * * *